May 19, 1970  A. J. PETROS  3,512,853
WATER AND LUBRICANT SEALING MEANS FOR MILL ROLLS
Filed May 29, 1968
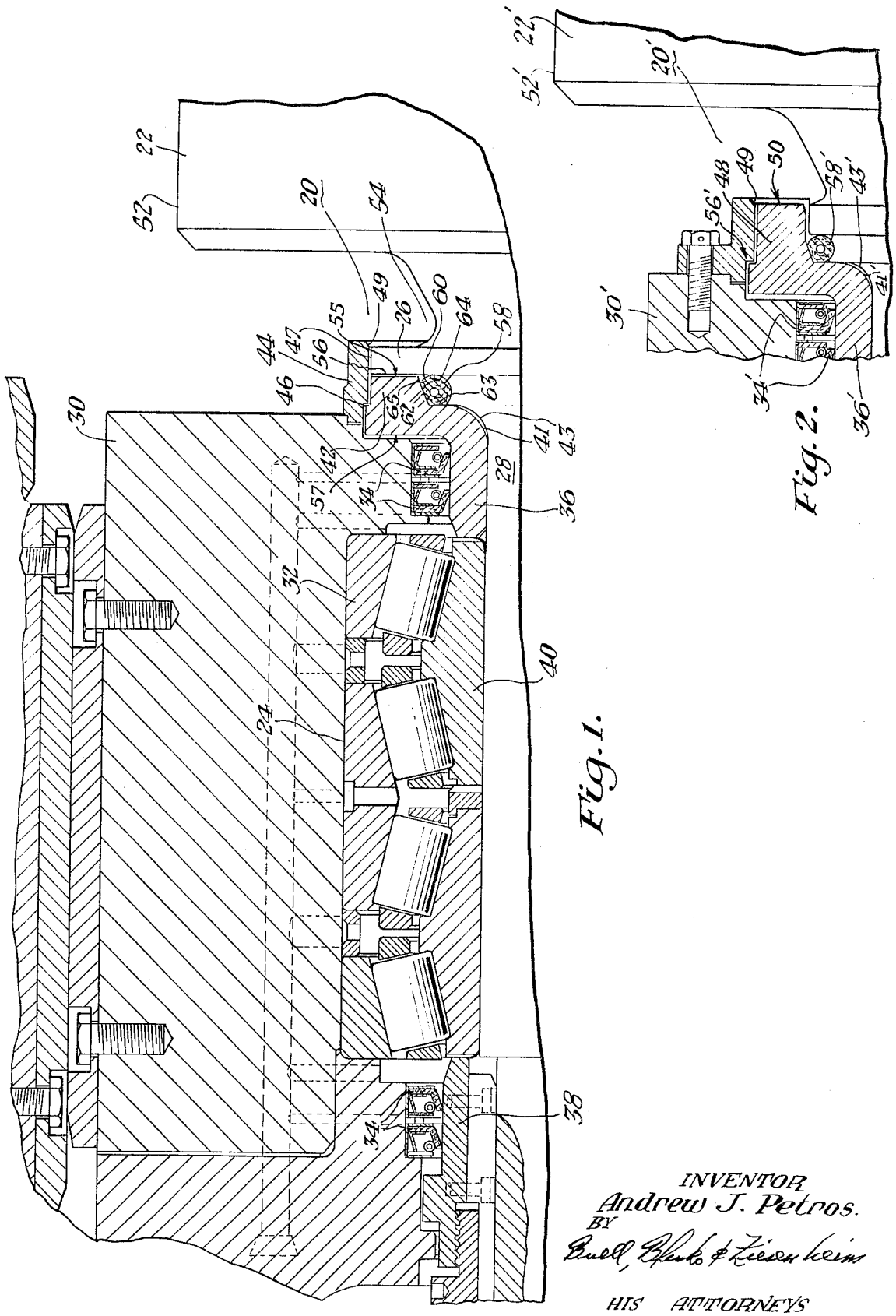
INVENTOR
Andrew J. Petros.
BY
HIS ATTORNEYS

United States Patent Office 3,512,853
Patented May 19, 1970

1

3,512,853
WATER AND LUBRICANT SEALING MEANS FOR MILL ROLLS
Andrew J. Petros, Pittsburgh, Pa., assignor to Mesta Machine Company, Pittsburgh, Pa.
Filed May 29, 1968, Ser. No. 733,147
Int. Cl. F16c *1/24, 33/78*
U.S. Cl. 308—36.1                                    12 Claims

ABSTRACT OF THE DISCLOSURE

I disclose water and lubricant sealing means for a mill roll and the like, said sealing means comprising a radially projecting circumferential flange on a roll neck of said mill roll, said roll neck being closely fitted into a bearing and bearing holder arrangement, a spacer ring mounted on said roll neck adjacent said roll neck flange and said bearing, a peripheral radially projecting flange attached to said spacing ring and shaped for substantially contiguous engagement with the adjacent surfaces of said roll neck flange, wiper seal means mounted on said bearing holder for wiping engagement with said spacer ring, at least one of the apposite surfaces of said roll neck flange and said spacer ring flange being shaped to define circumferential groove means, and resilient sealing means supported in said groove means for sealing engagement with juxtaposed surfaces of said roll neck and said spacer ring flanges.

---

The present invention relates to sealing means adaptable for use in a combined water and lubricant environment and more particularly to sealing means of the character described for mill roll bearings. The invention is especially directed to such sealing means which can be readily assembled and disassembled for roll changing purposes.

In the operation of rolling mills, such as those encountered in the steel industry, vast quantities of water frequently are employed for cooling purposes. In the past, entry of such water into the mill roll bearings has created serious lubricational and wear problems resulting in extreme cases in frozen bearings. Because of the tremendous forces involved in the operation of rolling mills, the roll bearings are lubricated with conventional oil type lubricants. For operation at maximum efficiencies, it is essential, therefore, to maintain the roll bearings free of water and other foreign materials.

The oil and grease seals employed heretofore have been effective in maintaining the lubricant within the roll bearings but have failed in varying degrees to prevent completely the entrance of seepage water and moisture into the bearings. As a result, the oil bearings have deteriorated rapidly in service and have required frequent maintenance or replacement. This results in the expenditure of considerable unnecessary labor and serious losses in production from the rolling mill.

Various types of oil, grease and other lubricant seals have been disclosed in the United States patents to Evangelista 3,141,708; Madeira 3,239,285; Barber 2,903,306; Sale 2,895,749; Sorenson 3,144,280; Ramsdell 3,336,091; Hanley 3,076,683; Zavoda 2,851,315; Scherba 2,906,565; Rich 2,868,574; Brooks 2,860,931 and Rich 3,093,425. Similar sealing arrangements are described in articles by Timken Roller Bearing in their 1963 Timken Engineering Journal pp. C58, C59, 32, 33, 166, 167 and by Lomax in Iron and Steel Engineer, September 1966. None of these references discloses effective means for the complete exclusion of water or moisture from bearings which means moreover can be quickly assembled and disassembled for roll changing purposes. None has disclosed the use of flexible sealing means such as an O-ring interposed between projecting flanges formed upon a demountable spacer and upon the mill roll neck. There are no adequate means disclosed, including the aforementioned roll neck and retainer flanges, for flinging water from the mill roll neck and for preventing the major proportion of the water from contacting the lubricant and water seals.

Hanley 3,076,683, for example, while disclosing the use of O-rings seals at a brake cam shaft, does not provide any means for preventing flooding of the area with water which would occur in mill roll applications. A water environment of this nature would eventually penetrate the wiping seals. Ramsdell 3,336,091 shows the use of lip seals directly engaging a rotating shaft, but again there is no provision for flinging off water or other foreign material. While Zavoda 2,851,315 utilizes centrifugal forces for preventing the lubricant from clogging the inner openings of the lubricant chamber and associated passages, there are no disclosed means for precluding water from entering various parts of the Zavoda bearing and for preventing flooding of the bearing environment.

As mentioned previously, none of the cited references discloses a lubricant and water seal for mill roll bearings, which is readily demountable to facilitate roll changing operations. In many rolling mill applications, it is necessary to change the work rolls two or three times per shift. Therefore, it is essential for optimum production to provide protective bearing sealing arrangements which can be quickly and easily assembled and disassembled.

I overcome these disadvantages of the prior art by providing lubricant water and sealing means including a roll mill neck flange, which can be integrally formed with the mill roll, if desired. A flanged spacer is mounted on the mill roll neck adjacent its flange and is sealed thereto by means of an O-ring or similar circumferential sealing means. The preponderate proportion of the cooling water or the like finding its way to the roll neck from the mill roll face is flung off by centrifugal forces developed at the spacer and roll neck flanges. Retainer means surround the roll neck and spacer flanges and aid in the mounting of the water and lubricant sealing means. Cooperating with the aforementioned water seal are one or more wiping type grease seals which can be engaged with the flanged spacer by means of garter type springs or the like. As will be evident from the following detailed description my novel lubricant and water sealing means can be readily assembled and disassembled for roll changing purposes.

I accomplish these desirable results by providing water and lubricant sealing means for a mill roll and bearing therefor, said sealing means comprising a radially projecting circumferential flange on a roll neck of said mill roll, said roll neck being closely fitted into a bearing and bearing holder arrangement, a spacer ring mounted on said roll neck adjacent said roll neck flange and said bearings, a peripheral radially projecting flange attached to said spacing ring and shaped for substantially contiguous engagement with the adjacent surfaces of said roll neck flange, wiper seal means mounted on said bearing holder for wiping engagement with said spacer ring, at least one of the apposite surfaces of said roll neck flange and said spacer ring flange being shaped to define circumferential groove means, and resilient sealing means supported in said groove means for sealing engagement with juxtaposed surfaces of said roll neck and said spacer ring flanges, whereby said sealing means can be readily assembled and disassembled for roll changing purposes.

I also desirably provide similar water and lubricant sealing means wherein a retaining ring is secured to said bearing holder and is shaped for retaining engagement with the outer peripheral surfaces of said spacer ring flange.

I also desirably provide similar water and lubricant sealing means wherein said spacer ring laterally engages said bearing on one side and on the other substantially engages said roll neck flange to space said flange from said bearing and to position said roll neck relative to said bearing.

I also desirably provide similar water and lubricant sealing means wherein circumferential complementary recess means are formed on said roll neck flange and said spacing ring flange respectively to form said groove means, and said sealing means include a resilient O-ring co-extending with said groove means.

During the foregoing discussion, various objects, features and advantages of the invention have been set forth. These and other objects, features and advantages of the invention together with structural details thereof will be elaborated upon during the forthcoming description of presently preferred embodiments of the invention and presently preferred methods of practicing the same.

In the accompanying drawings I have shown certain presently preferred embodiments of the invention and have illustrated presently preferred methods of practicing the invention, wherein:

FIG. 1 is a hoirzontally sectioned view showing portions of a typical mill roll neck and roller bearing provided with my novel water and lubricant sealing means; and FIG. 2 is a vertical, longitudinally sectioned view of another form of the sealing means shown.

Referring now more particularly to the drawings, the sealing means 20 of the invention as shown therein is mounted on mill roll 22 provided with a conventional roll neck roller bearing 24. Desirably my novel sealing means 20 is employed in combination with roll neck flange or flinger 26 formed integrally in this example on the mill roll neck 28.

Typically, the roll neck bearing 24 is of four row tapered roller construction and is mounted in a suitable holder such as bearing chock 30 in the conventional manner. Lubricant is supplied to the bearing 24 through passages in the bearing chock 30 and outer bearing race 32. Lubricant is confined to the bearing 24 by one or more wiping seals 34 provided adjacent each end of the bearing 24. The fore and aft wiping seals 34 respectively engage spacers 36, 38 which are rotated with the roll neck 28. The bearing 24, aft wiping seals 34, and spacer 38 are conventional in construction and will not be further described.

The fore spacer or spacing ring 36, however, cooperates with the roll neck flange 26, fore wiping seals 34, and inner bearing race 40 for purposes of preventing entry of water and other foreign material into the bearing 24 or between the inner race 40 of the bearing and the adjacent surfaces of the roll neck 28. My novel sealing means also prevents the escape of bearing lubricant in the opposite direction. In furtherance of this purpose, the spacing ring 36 is provided with an integral circumferentially extending flange 42 shaped for substantial, complementary engagement with the adjacent surfaces of the roll neck flange or flinger 26. With a mill roll 22 in place, the spacing ring 36 thus positions the roll neck 28 by lateral engagement with the roll neck flange 28 and inner bearing race 40. It will also be seen in FIG. 1 and 2 that the rounded lateral edge portion 41 of the spacer 36 is of slightly larger radius than that of the adjacent roll neck fillet 43 to assure a close engagement between the roll neck flange and the spacer ring flange.

A retaining ring 44, which can be bolted to bearing chock 30 as better shown in FIG. 2 of the drawings, is used to retain the spacing ring 36 when the mill roll 22 is removed. The spacer 36 is then secured by shouldered engagement with the retaining ring 44 as denoted by reference character 46. Desirably the retaining ring 44 is extended over the outer peripheral edges 47 of the roll neck flange 26 to minimize the entrance of water and other foreign material into passages 56. To facilitate both the insertion of the roll neck flange 26 into the retaining ring 44 and the removal of cooling water by the flange or flinger 26, the retainer ring 44 is chamferred at 49. The outward deflection of water (relative to the bearing chock 30) by the chamber 49 further minimizes the entry of water into the passages 56.

Alternatively, as shown in FIG. 2, the spacer flange 42' is extended at 48 to overly the outer edge of a radially shorter roll neck flange 26' to make entry of particular foreign matter less likely. The outer face surface 50 of the spacer flange 42' then serves to fling off water.

In operation cooling water from roll face 52 is entrapped or dammed at the integral roll neck flange or flinger 26. The preponderant proportion of this water or other foreign material is removed during operation of the roll 22 from reservoir 54 by the centrifugal action of the roll neck flange 26 (FIG. 1) or by the combined action of the roll neck flange 26' and the spacer flange surface 50 (FIG. 2). A minute quantity of the water, however, may enter the rotative clearances 56 between the retaining ring 44 and the circumferential edges of the roll neck flange 26 and the spacer flange 42. However, the sealing means 20 prevents further penetration of the water over the outer surfaces of the spacing ring 36 by means of the adjacent wiping seals 34 and the centrifugal or flinging action of the adjacent radial surfaces 55 and 57 of the spacer flange 42.

An O-ring 58 or similar sealing means is seated in circumferential cavity or groove means 60 formed by complementary grooves or recess means 62, 64 formed on the spacer flange 42 and roll neck flange 26 respectively. The O-ring 58 prevents entry of water through that passage 56 between the roll neck and spacer flanges 26, 42. This blockage of water by centrifugal action and by the wiping seals 34 and the O-ring 58 prevents water from entering the bearing 32 or the inevitable clearances between the roll neck 28 and the inner bearing race 40 and thus obviates the disasterous effects mentioned previously. In this example, the groove 64 of the roll neck flange 26 is rounded for complementary and initially retentive engagement with the O-ring 58. On the other hand, the retainer flange groove 62 is formed with flattened surfaces 63, 65 which deform the O-ring 58 to enhance its sealing properties.

For roll-changing purposes the roll neck 28 is simply withdrawn from the inner bearing race 40 and the spacers 36, 38. To facilitate withdrawal the roll neck 28 can be tapered. During the roll removal operation, the spacer 36 is retained in place by the aforedescribed retaining ring 44. With the mill roll 22 in place the spacing rings 36 position the roll necks 28 relative to their associated bearings 24. By the same token the bearings 24 urge the spacing rings 36 into sealing engagement with O-ring 58 and roll neck flanges 26.

From the foregoing it will be apparent that novel and efficient forms of water and lubricant sealing means for mill rolls have been disclosed herein. While I have shown and described certain presently preferred embodiments of the invention and have illustrated certain presently preferred methods of practicing the same, it is to be distinctly understood that the invention is not limited thereto but may be otherwise variously embodied and practiced within the spirit and scope of the invention.

I claim:

1. Water and lubricant sealing means for a mill roll and bearing therefor, said sealing means comprising a radially projecting stepped circumferential flange on a roll neck of said mill roll, said roll neck being closely fitted into a bearing and bearing holder arrangement, a spacer ring mounted on said roll neck adjacent said roll neck flange and said bearing, a peripheral radially projecting flange attached to said spacing ring and shaped for substantially contiguous engagement with adjacent surfaces of said roll neck flange, wiper seal means mounted on said bearing holder for wiping engagement with said spacer ring, at least one of a stepped portion of said roll neck flange and said spacer ring flange being shaped to define circumferential groove means, resilient sealing means supported in said groove means for sealing engagement with juxtaposed surfaces of said roll neck stepped portion and said spacer ring flanges, and a retaining ring secured to said bearing holder and shaped for retaining engagement with the outer peripheral surfaces of said spacer ring flange, whereby said sealing means can be readily assembled and disassembled for all changing purposes.

2. The combination according to claim 1 wherein said spacer ring laterally engages said bearing on one side and on the other substantially engages said roll neck flange to space said flange from said bearing and to position said roll neck relative to said bearing.

3. The combination according to claim 1 wherein circumferential complementary recess means are formed on said roll neck flange and said spacing ring flange respectively to form said groove means, and said sealing means include a resilient O-ring co-extending with said groove means.

4. The combination according to claim 1 wherein said roll neck flange defines a water-collecting circumferential cavity adjacent a roll face of said mill roll.

5. The combination according to claim 1 wherein said retaining ring extends over the outer peripheral edge portion of said roll neck flange for minimizing access of foreign material to said sealing means.

6. The combination according to claim 3 wherein one of said groove means includes flattened surfaces to ensure distortion of said sealing means for an optimum sealing characteristic.

7. The combination according to claim 3 wherein said spacer ring flange radially overlies said roll neck flange for close juxtaposition to said retaining ring.

8. Water and lubricant sealing means for a mill roll and bearing therefor, said sealing means comprising a radially projecting stepped circumferential flange on a roll neck of said mill roll, said roll neck being closely fitted into a bearing and bearing holder arrangement, a spacer ring mounted on said roll neck adjacent said roll neck flange and said bearing, a peripheral radially projecting flange attached to said spacing ring and shaped for substantilly contiguous engagement with adjacent surfaces of said roll neck flange, wiper seal means mounted on said bearing holder for wiping engagement with said spacer ring, at least one of a stepped portion of said roll neck flange and said spacer ring flange being shaped to define circumferential groove means, resilient sealing means supported in said groove means for sealing engagement with juxtaposed surfaces of said roll neck stepped portion and said spacer ring flanges, and a retaining ring secured to said bearing holder and shaped for retaining engagement with the outer peripheral surfaces of said spacer ring flange, whereby said sealing means can be readily assembled and disassembled for roll changing purposes, said spacer ring flange having an axial extension radially and closely overlying said roll neck flange and including a radial surface in substantial alignment with said roll neck flange for water flinging purposes and for at least aiding in defining a water-collecting circumferential cavity adjacent a roll face of said mill roll.

9. The combination according to claim 1 wherein peripheral water deflecting means are provided on said retaining ring.

10. The combination according to claim 9 wherein said water deflecting means include a chamfer formed on an adjacent circumferential edge of said retaining ring and overlying the adjacent radial surface of said roll neck flange.

11. The combination according to claim 10 wherein a retaining ring is secured to said bearing holder and is shaped for retentive engagement with an outer peripheral surface of said spacer ring flange.

12. The combination according to claim 11 wherein peripherally extending water deflecting means are provided on said retaining ring.

References Cited

UNITED STATES PATENTS

| | | | |
|---|---|---|---|
| 1,957,054 | 5/1934 | Waldorf | 308—187.1 X |
| 2,055,532 | 9/1936 | Hektner | 277—53 X |
| 2,161,768 | 6/1939 | Smitmans | 308—36.1 |
| 2,243,009 | 5/1941 | Kingsbury | 308—36.1 |
| 2,328,676 | 9/1943 | Rich | 308—36.1 |
| 2,592,645 | 5/1952 | Kayser | 308—187.1 X |
| 2,990,201 | 6/1961 | Stephens | 308—187.2 X |
| 3,169,809 | 2/1965 | Pendleton | 368—187.1 X |

FOREIGN PATENTS

| | | |
|---|---|---|
| 1,024,699 | 5/1953 | France. |
| 924,605 | 5/1963 | Great Britain. |

OTHER REFERENCES

German printed publication 1,049,166, January 1959.

MARTIN P. SCHWADRON, Primary Examiner

L. L. JOHNSON, Assistant Examiner

U.S. Cl. X.R.

277—53, 57; 308—187.1

UNITED STATES PATENT OFFICE
CERTIFICATE OF CORRECTION

Patent No. 3,512,853                          May 19, 1970

Andrew J. Petros

It is certified that error appears in the above identified patent and that said Letters Patent are hereby corrected as shown below:

Column 2, line 8, "O-rings" should read -- O-ring --. Column 3, line 24, "hoirzontally" should read -- horizontally --. Column 4, line 6, "chamber" should read -- chamfer --. Column 5, line 12, "all" should read -- roll --; line 47, "substantilly" should read -- substantially --.

Signed and sealed this 5th day of January 1971.

(SEAL)
Attest:

Edward M. Fletcher, Jr.                       WILLIAM E. SCHUYLER, JR.
Attesting Officer                               Commissioner of Patents